Aug. 7, 1928.
J. H. BOCKSTADTER
1,679,806
GARDEN IMPLEMENT
Filed March 26, 1927
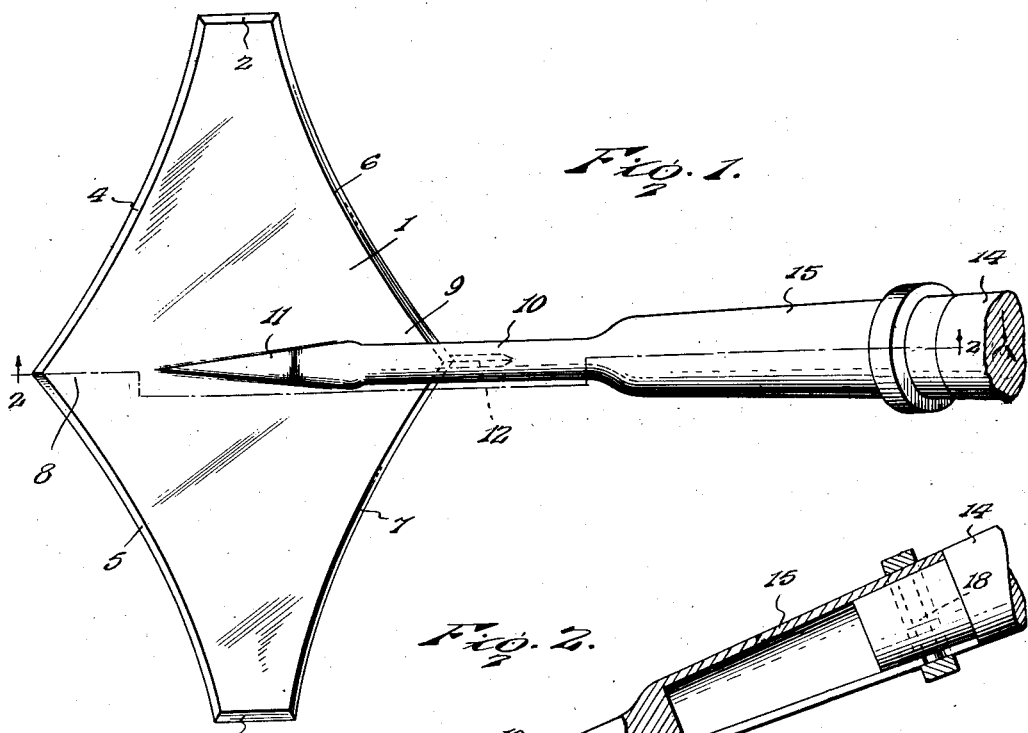
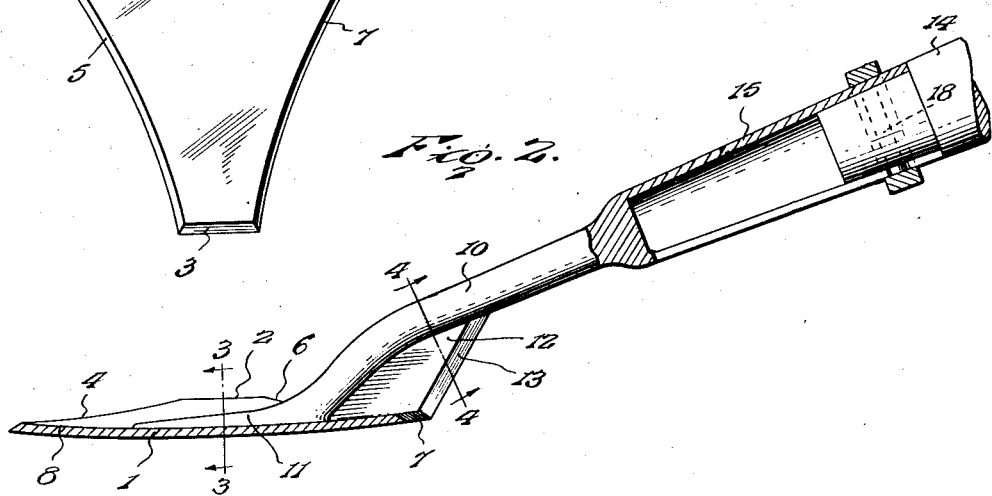
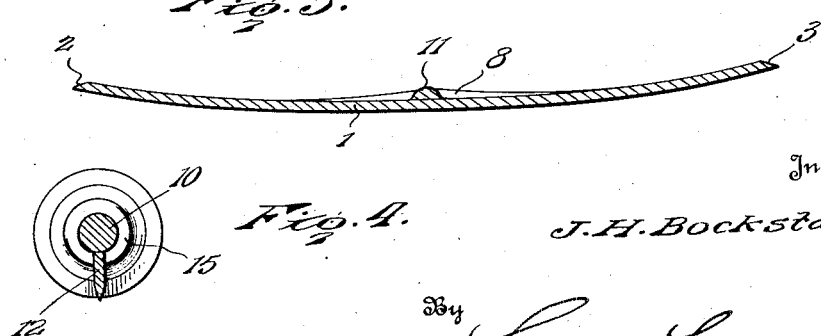
Inventor
J. H. Bockstadter
By Lacey & Lacey, Attorneys Patented Aug. 7, 1928.

1,679,806

UNITED STATES PATENT OFFICE.

JOHN H. BOCKSTADTER, OF HASTINGS, NEBRASKA.

GARDEN IMPLEMENT.

Application filed March 26, 1927. Serial No. 178,706.

This invention relates to garden implements and more particularly to a weeder or hoe used for uprooting weeds or cutting them off close to the ground and also employed to loosen dirt about growing plants.

One object of the invention is to provide a weeder or hoe which may be easily forced into the ground and is formed with a plurality of cutting edges disposed in such angular relation to each other that a slicing action will take place no matter in which direction the blade is moved.

Another object of the invention is to provide a blade which is slightly concavo-convex and thereby permitted to be easily used and also greatly strengthened.

Another object of the invention is to strengthen the shank of the blade by means of a web which serves not only as a brace for the shank but also constitutes an auxiliary cutting blade having a sharpened rear edge disposed in a vertical plane between the shank and the rear portion of the main blade.

The invention is illustrated in the accompanying drawing, wherein

Figure 1 is a view showing the improved implement in top plan;

Fig. 2 is a longitudinal sectional view taken on the line 2—2 of Fig. 1;

Fig. 3 is a transverse sectional view taken on the line 3—3 of Fig. 2, and

Fig. 4 is a transverse sectional view through the shank taken on the line 4—4 of Fig. 2.

The blade 1 of the improved implement is formed of tempered steel or any other strong metal desired and is of a slightly concavo-convex formation, as shown in Figs. 2 and 3. This formation imparts strength to the blade and also allows it to be rocked in the ground or upon the ground when the hoe is in use. By referring to Fig. 1, it will be seen that the blade is formed with straight cut ends which are ground to provide cutting edges 2 and 3 and that its forward and rear edges are formed with arcuate sections which follow convex curves and are ground to provide cutting edges 4, 5, 6 and 7. The arcuate portions of the forward and rear edges of the blade converge from the straight cut end edges 2 and 3 towards the intermediate portion of the blade where they intersect to provide the blade with tapered forward and rear portions 8 and 9. Therefore, the blade when viewed in top plan is substantially diamond shape but is not a true diamond shape as it has its end portions formed with the straight cut sharpened edges 2 and 3. By having the blade formed as shown, its cutting edges will be disposed in such angular relation to each other that the blade may be very easily forced into the soil and a cutting action takes place no matter in which direction the blade is moved.

The shank 10 is also formed of metal and at its forward end is provided with a foot 11 which extends between the tapered forward and end portions 8 and 9 of the blade and is welded or otherwise rigidly secured upon the convex upper surface of the blade. The foot is disposed in spaced relation to the apex of the tapered rear portion 9 and the shank extends upwardly and rearwardly from the foot in overhanging relation to the tapered rear portion of the blade and projects rearwardly from the blade. In order to brace the shank, there has been provided a web 12 which extends in a vertical plane and is disposed between the shank and the tapered rear end portion of the blade. The web extends entirely across the space between the shank and the tapered rear portion of the blade, as shown in Fig. 2, and is formed with a sharpened rear edge 13 constituting a cutting edge which extends upwardly from the apex of the rear extension 9 of the blade at a rearward incline. It will thus be seen that the web serves not only as a bracing element for the shank and tapered rear portion of the blade but also constitutes a vertically disposed auxiliary cutting blade adapted to slice through the ground when the blade is moved rearwardly. This web also constitutes a stabilizer which will cause the blade to move evenly through the ground.

The handle 14 fits into a socket 15 projecting rearwardly from the shank 10 and may be held therein in any desired manner.

Having thus described the invention, I claim:

1. A hoe comprising a blade, a shank extending upwardly and rearwardly from said blade in spaced relation to the rear edge thereof, said blade having sharpened front and rear edges each having portions converging from the ends of the blade towards a point intermediate the width thereof and intersecting to form a forward penetrating point in front of said shank and a rear penetrating point beneath the shank, and a web extending between said shank and the tapered rear portion of the blade and constituting an auxiliary blade having a sharpened rear edge.

2. A hoe comprising a blade, a shank extending upwardly and rearwardly from said blade and having its forward end secured upon the upper face of the blade intermediate its width and in spaced relation to the rear edge thereof, the said rear edge having portions converging from the ends of the blade and intersecting beneath the shank, and a vertically disposed reinforcing web extending between said shank and the portion of the blade to the rear of the attached forward end of the shank and constituting an auxiliary blade having a sharpened rear edge meeting the blade at the intersection of the converging portions of the rear edge of the blade.

3. A hoe comprising a blade having straight cut sharpened edges at its ends and having its forward and rear edges formed with sharpened inwardly curved arcuate sections leading from the ends of the sharpened edges at the ends of the blade and converging and intersecting intermediate the width of the blade to provide the blade with forwardly and rearwardly tapered intermediate portions, a shank secured upon the upper surface of said blade intermediate the tapered forward and rear portions thereof and extending upwardly and rearwardly from the blade, and a web extending vertically between the shank and tapered rear portion of the blade and constituting an auxiliary blade having a sharpened rear edge.

In testimony whereof I affix my signature.

JOHN H. BOCKSTADTER. [L. S.]